United States Patent
Kimbell et al.

(10) Patent No.: US 6,456,732 B1
(45) Date of Patent: Sep. 24, 2002

(54) AUTOMATIC ROTATION, CROPPING AND SCALING OF IMAGES FOR PRINTING

(75) Inventors: Benjamin D. Kimbell, Boulder; Dan L. Dalton, Greeley; Michael L. Rudd, Ft. Collins, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/151,892

(22) Filed: Sep. 11, 1998

(51) Int. Cl.⁷ .................................................. G06K 9/00
(52) U.S. Cl. ...................... 382/112; 358/449; 382/180; 399/187; 707/521
(58) Field of Search ................................ 382/112, 175, 382/176, 297, 298, 299, 276, 289; 358/537, 538, 401, 448, 449, 453, 464, 474, 488, 451, 1.2, 1.9, 1.18; 399/133, 155, 156, 160, 182, 183, 188, 190, 196, 86, 130; 707/526, 521; 427/153

(56) References Cited

U.S. PATENT DOCUMENTS

| | | | | |
|---|---|---|---|---|
| 3,618,032 A | * | 11/1971 | Goldsberry et al. | 707/517 |
| 4,047,811 A | * | 9/1977 | Allis et al. | 399/190 |
| 4,593,989 A | * | 6/1986 | Fujiwara et al. | 399/190 |
| 4,907,033 A | * | 3/1990 | Maruta et al. | 355/320 |
| 5,020,115 A | * | 5/1991 | Black | 382/298 |
| 5,053,885 A | | 10/1991 | Telle | 358/449 |
| 5,191,429 A | * | 3/1993 | Rourke | 358/296 |
| 5,212,568 A | * | 5/1993 | Graves et al. | 358/474 |
| 5,220,649 A | * | 6/1993 | Forcier | 707/541 |
| 5,260,805 A | * | 11/1993 | Barrett | 358/449 |
| 5,280,367 A | | 1/1994 | Zuniga | 358/462 |
| 5,438,430 A | * | 8/1995 | Mackinlay et al. | 358/450 |
| 5,483,606 A | | 1/1996 | Denber | 382/294 |
| 5,546,474 A | | 8/1996 | Zuniga | 382/176 |
| 5,557,728 A | | 9/1996 | Garrett et al. | 395/157 |
| 5,596,655 A | | 1/1997 | Lopez | 382/173 |
| 5,623,681 A | * | 4/1997 | Rivette et al. | 707/530 |
| 5,713,070 A | | 1/1998 | Ohkubo | 399/363 |
| 5,784,487 A | * | 7/1998 | Copperman | 382/175 |
| 5,838,836 A | * | 11/1998 | Omvik | 382/276 |
| 5,880,858 A | * | 3/1999 | Jin | 358/487 |
| 5,943,679 A | * | 8/1999 | Niles et al. | 707/526 |
| 5,960,448 A | * | 9/1999 | Reichek et al. | 707/526 |
| 5,974,199 A | * | 10/1999 | Lee et al. | 382/289 |
| 5,978,519 A | * | 11/1999 | Bollman et al. | 382/282 |
| 6,011,635 A | * | 1/2000 | Bungo et al. | 358/488 |
| 6,043,823 A | * | 3/2000 | Kodaira et al. | 345/433 |
| 6,240,204 B1 | * | 5/2001 | Hidaka et al. | 382/167 |
| 6,389,434 B1 | * | 5/2002 | Rivette et al. | 707/530 |

* cited by examiner

Primary Examiner—Jayanti K. Patel
(74) Attorney, Agent, or Firm—Augustus W. Winfield

(57) ABSTRACT

A method for automatically cropping, rotating, and scaling a scanned image to ensure that a printed copy of the scanned image is the same size as the original, when possible. The method attempts to honor the default or operator designated orientation of the printed image, but will automatically rotate the image if that will eliminate unnecessary image reduction. Optimal orientation and scaling factors are automatically determined based on the target page size and the size and shape of the information of interest in the original image (not the boundaries of the original document). The operator selects a desired printed orientation (or accepts a default orientation) and selects a desired printed paper size (or accepts a default printed paper size). If an image will fit within the printable margins without rotation or cropping, the image is simply printed without modification. If the image will fit without rotation by cropping white space, then white space is cropped. If the image with all white space cropped will still not fit, the image is oriented so that long sides on the cropped image align with long sides on the printed paper. If the cropped and rotated image still does not fit, the cropped image is scaled to fit within the printable margins and the image is oriented so that long sides on the cropped image align with long sides on the printed paper.

3 Claims, 3 Drawing Sheets

AUTOMATIC ROTATION, CROPPING AND SCALING OF IMAGES FOR PRINTING

FIELD OF INVENTION

This invention relates generally to printing copies of documents that have been scanned by optical scanners, digital cameras, facsimile machines, digital photocopiers, or other digital imaging devices, and more specifically to an automatic method of rotating, cropping and scaling of images for printing.

BACKGROUND OF THE INVENTION

Photocopiers typically require the operator to properly orient the original document and may require the operator to select the proper paper bin. For example, for landscape mode, the operator typically must orient the original document in a landscape orientation and select a paper bin having paper in a landscape orientation. Similarly, when printing a scanned image from a computer, the operator typically must specify orientation of the image on the page. If an operator makes an inappropriate choice, resources such as toner, paper, and time may be wasted if the photocopier prints pages that are not useful or not what was expected.

Photocopiers also typically require an operator to input or choose a scale factor to reduce oversized images to fit onto the output page or to magnify small images to fit onto the output page. Some photocopiers may provide an automatic scaling feature, in which the printed document size is automatically scaled based on the dimensions of the edges of the original document.

Photocopiers typically can print to the edges of the output page. In contrast, many computer software applications, for example word processing software, force unprintable margins around the edges of a page. In addition, many computer software applications automatically scale an image to fit inside the unprintable margins. Consider an image, including printed text, that is scanned by a document scanner. Assume that the scanned image includes white space around the edges. If that scanned image is imported into a word processor and reprinted, word processing software will typically reduce the image, including the scanned margins, to fit within the printable area of a page. The net result is that the printed text is reduced in size.

In some situations, the primary goal is a printed page with an image of interest that is as large as possible. There is a need for additional automation in optimizing the printed size of a scanned image.

SUMMARY OF THE INVENTION

One goal of the present invention is make the printed image the same size as the original image (or slightly larger) when possible. The method attempts to honor the default or operator designated orientation of the printed image, but will automatically rotate the image if that will eliminate unnecessary image reduction. Optimal orientation and scaling factors are automatically determined based on the target page size and the size and shape of the original image (not the boundaries of the original document). The operator selects a desired printed orientation (or accepts a default orientation) and selects a desired printed paper size (or accepts a default printed paper size). If an image will fit within the printable margins without rotation or cropping, the image is simply printed without modification. If there is white space that can be cropped, and if the image will fit without rotation by cropping white space, then white space is cropped. If the image with all white space cropped will still not fit, and if the image is not oriented so that long sides on the cropped image align with long sides on the printed paper, then the image is rotated. If the cropped and rotated image still does not fit, the cropped and rotated image is scaled to fit within the printable margins and the image is oriented so that long sides on the cropped image align with long sides on the printed paper.

DETAILED DESCRIPTION OF THE PREFERRED EMBODIMENT OF THE INVENTION

Figure 1A:
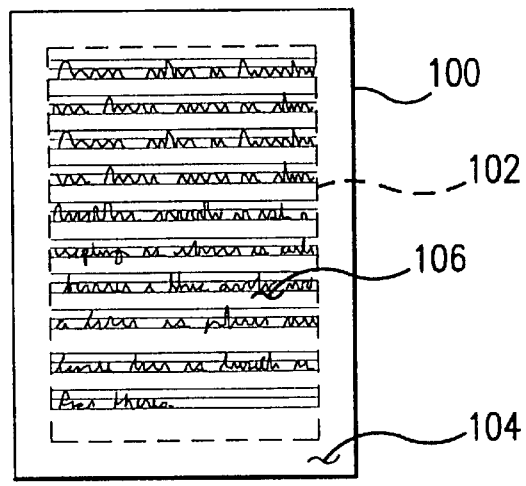
FIG. 1A is a plan view of a scanned document with white margins.

FIG. 1A illustrates an image 100 resulting from scanning a text document. Dashed line 102 is not part of the image, but instead depicts a rectangular boundary between a margin 104 containing only "white space" and non-white information of interest 106, which in this example image is text.

Figure 1B:
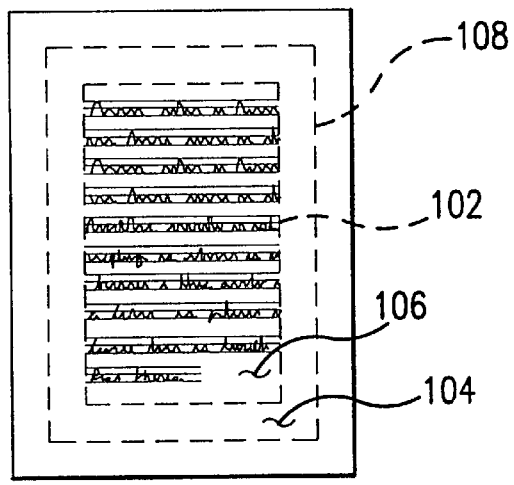
FIG. 1B is a plan view of the scanned document of FIG. 1A reduced within printable margins of a printed page.

FIG. 1B illustrates the typical situation when image 100 is printed using computer software. Dashed line 108 depicts the printable area on the page as determined by printer hardware, and known by the computer software. Often, computer software will avoid clipping an image, and instead will scale an image to fit within the printable area of a page. In FIG. 1B, image 100 has been slightly reduced by the computer software so that the entire scanned image 100, including the margins 104, is printed within the printable area depicted by line 108. Specifically, for text as illustrated in FIG. 1A, the text in FIG. 1B is smaller than the text in FIG. 1A.

Figure 1C:
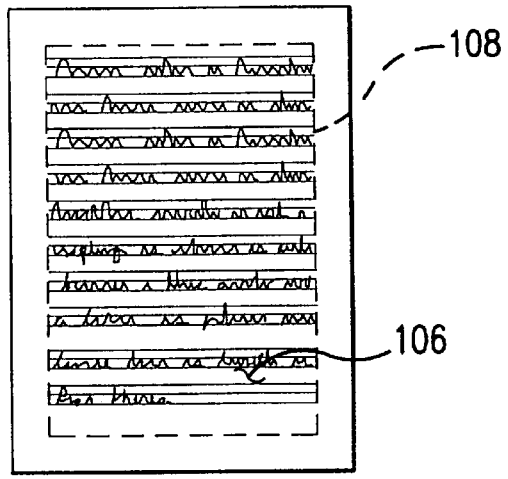
FIG. 1C is a plan view of the scanned document of FIG. 1A, printed within printable margins of a printed page, without reduction but with cropped margins.

FIG. 1C illustrates a first aspect of a method in accordance with the present invention, which is to digitally crop the image before sending the image to a printer or to software for printing, so that the resulting information of interest 106 (text in the example) in FIG. 1C is the same size as (or larger than) the corresponding information of interest in FIG. 1A. One approach is to simply always crop (delete margin data) the entire margin 104 of FIG. 1A so that the information of interest 106 in FIG. 1C extends to the edges of the printable area depicted by line 108. If a large margin is entirely cropped, the image of interest may be enlarged if sent to software for printing. Alternatively, if the goal is to always keep the printed image the same size as the original image of interest, sufficient margin may be cropped to keep the printed image the same size as the original even if sent to software for printing. If the cropped image is to be sent direct to a printer, printers typically do not scale, so that full cropping will still result in the printed image of interest having the same size as the original image of interest. If margins are completely cropped, the image of interest is then preferably centered horizontally and vertically within the printed page. One reason for centering is to avoid printing the image of interest in the upper left corner where a staple may interfere. Note that some images may not have any white space to be cropped, and some images may have a lot of white space, only some of which needs to be cropped. In general, if white space is present, sufficient cropping is performed to make the resulting cropped image fit, if possible.

Figure 2A:
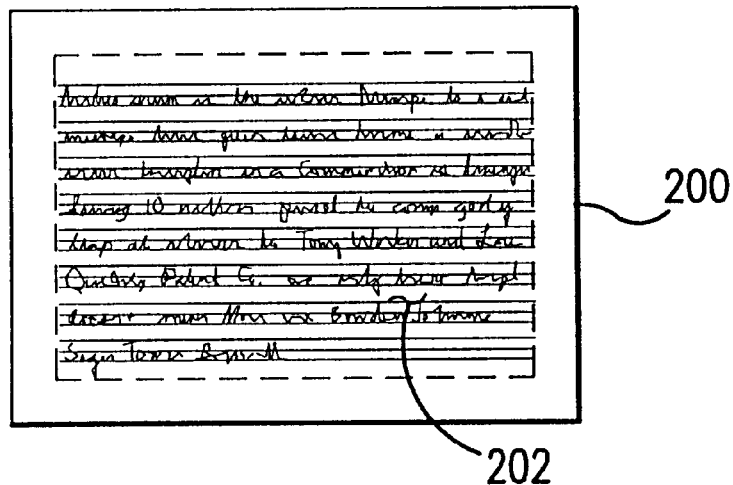
FIG. 2A is a plan view of a scanned document.

FIG. 2A illustrates a scanned image 200 that includes non-white image area of interest (for example, scanned text) 202, where the information of interest 202 is wider than the shortest dimension of the printable area depicted by line 108 in FIGS. 1B and 1C. That is, if image 200 is printed onto a page in portrait orientation, the image must be reduced or some of the information of interest 202 will be cropped during printing. In the present application, automatic rotation is preferable to scaling or cropping of information of interest in the image. Accordingly, if image 200 will not fit, even after cropping, within the printable area in its original orientation, and if the longest dimension of the rectangular non-white image 200 is not aligned with the longest dimension of a rectangular printable area, then the image is rotated. If the longest dimension of the rectangular non-white image 200 is already aligned with the longest dimension of a rectangular printable area, then no rotation is performed.

Figure 2B:
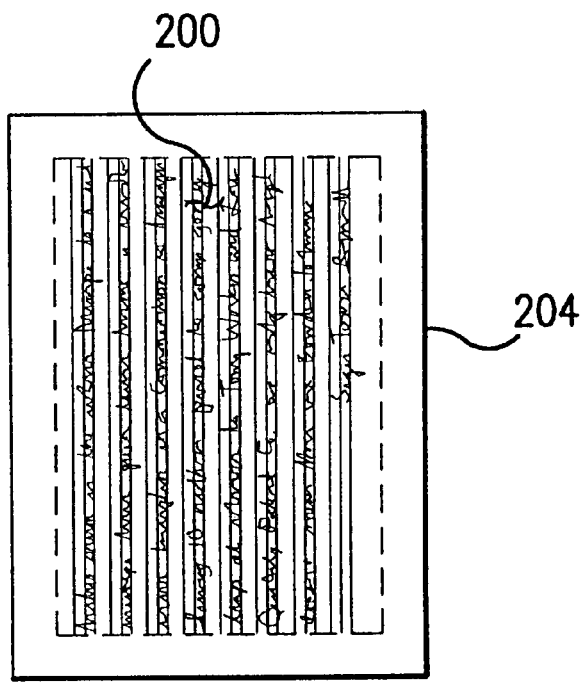
FIG. 2B is a plan view of the document of FIG. 2A cropped and rotated and printed within printable margins of a printed page.

In FIG. 2B, image 200 has been cropped (to remove white space margins only) and rotated so that the longest dimension of the non-white image 202 is aligned with the longest dimension of the printable area on printed page 204. The non-white image 202 in FIG. 2B is the same size as non-white image 202 within the original image 200 in FIG. 2A. The non-white image 202 is scaled only if it will not fit into the printable area after cropping and rotation (if appropriate).

Figure 3:
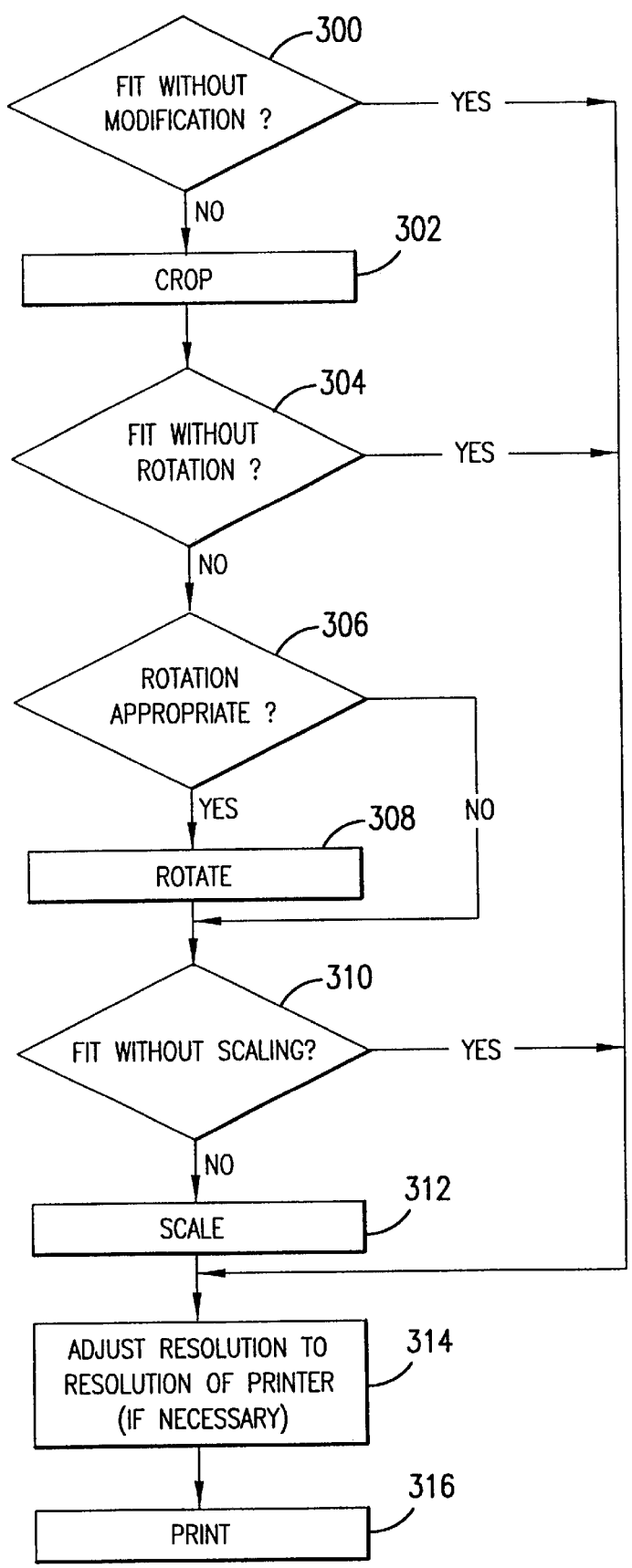
FIG. 3 is flow chart of a method of cropping, rotating and scaling in accordance with the invention.

FIG. 3 is a flow chart of a method in accordance with the present invention. Before entry into the method of FIG. 3, a preferred printed orientation is selected (or a default orientation is accepted). In addition, a printed page size is selected (or a default page size is accepted). Before entry into the method of FIG. 3, the image is oriented according to the selected orientation. At decision 300, if a scanned image will fit, within the printable area, in the selected orientation, without cropping, rotating, or scaling, then the image is saved or transferred without modification. Otherwise, at step 302, white-space margins (if available) are identified and cropped (margin data is deleted), entirely or just to the extent necessary to make the image fit. For examples of methods for automatic classification of various areas of an image (to determine a rectangle defining the information of interest), see U.S. Pat. Nos. 5,280,367; 5,546,474; and 5,596,655. At decision 304, if the scanned image will fit, within the printable area in the selected orientation, after cropping but without rotation or scaling, then the image is saved or transferred without rotation or scaling. Otherwise, at decision 306, if the longest dimension on the cropped image does not align with the longest dimension of the printable area on the printed paper, then the image is rotated ninety degrees (step 308). At decision 310, if the scanned image will fit, within the printable area, after cropping and after rotation (if appropriate) but without scaling, then the image is saved or transferred without scaling. Otherwise, the image is scaled to fit at step 312.

One alternative goal of the present invention is make the non-white portion of the printed image the same size as the non-white information of interest portion of the original image, when possible. If one pixel in the scanned image is printed as one pixel on the printed page, then the scanned image and the printed image need to have the same resolution. Accordingly, at step 314, given the printer resolution, if the resolution of the scanned image is different than the resolution of the printer, the image resolution is adjusted (by interpolation, decimation, or both) to match the resolution of the printer. For example, if the resolution of the image is 300 pixels per inch and the resolution of the printer is 600 pixels per inch, the image pixels may be interpolated to double the effective resolution. Alternatively, if resolution of the image is 600 pixels per inch and the resolution of the printer is 300 pixels per inch then the image pixels are decimated to halve the effective resolution. For non-integral ratios, image pixels may be interpolated and then decimated to provide the proper resolution.

Some document scanners may be interfaced to a computer that in turn is interfaced to a printer. In a configuration including a computer, the automated cropping, rotation, and scaling may be performed by firmware within the scanner or by software in the computer, or by firmware within the printer. Some document scanners may be directly interfaced to a printer, so that a copy mode may be performed without an intermediate computer. In a direct connection, the automated cropping, rotation, and scaling may be performed by firmware within the scanner, or by firmware within the printer.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of automatically modifying a scanned image by a system, the method comprising the following steps:

(a) determining, by the system, that the scanned image will not fit within a printable area of a printed page;

(b) determining, by the system, that the scanned image data includes margins that do not need to be printed; and (c) deleting, by the system, data corresponding to the margins of the scanned image.

2. The method of claim 1 further comprising:

(d) determining, by the system, that the scanned image after deleting margin data in step (c) will not fit within the printable area of the printed page; and (e) rotating, by the system, the scanned image ninety-degrees.

3. The method of claim 2 further comprising:

(f) determining, by the system, that the scanned image will not fit within the printable area of the printed page even with cropping and rotating; and (g) scaling, by the system, the scanned image to fit within the printable area of the printed page.

* * * * *